United States Patent
Frederickson et al.

(10) Patent No.: US 9,396,574 B2
(45) Date of Patent: Jul. 19, 2016

(54) CHOREOGRAPHY OF ANIMATED CROWDS

(71) Applicant: Pixar, Emeryville, CA (US)

(72) Inventors: Michael Frederickson, San Francisco, CA (US); James David Northrup, Berkeley, CA (US)

(73) Assignee: Pixar, Emeryville, CA (US)

( * ) Notice: Subject to any disclaimer, the term of this patent is extended or adjusted under 35 U.S.C. 154(b) by 392 days.

(21) Appl. No.: 13/931,476

(22) Filed: Jun. 28, 2013

(65) Prior Publication Data
US 2015/0002516 A1    Jan. 1, 2015

(51) Int. Cl.
    G06T 13/00    (2011.01)
    G06T 13/40    (2011.01)

(52) U.S. Cl.
    CPC .................................. G06T 13/40 (2013.01)

(58) Field of Classification Search
    CPC ............................ G06T 13/40; G06T 13/20
    USPC ........................................................ 345/474
    See application file for complete search history.

(56) References Cited

U.S. PATENT DOCUMENTS

| | | | |
|---|---|---|---|
| 2004/0012594 A1* | 1/2004 | Gauthier et al. | 345/473 |
| 2005/0071306 A1* | 3/2005 | Kruszewski et al. | 706/47 |
| 2007/0159487 A1* | 7/2007 | Felt | 345/474 |
| 2008/0018792 A1* | 1/2008 | Bhat et al. | 348/578 |
| 2010/0238182 A1* | 9/2010 | Geisner et al. | 345/474 |
| 2013/0300751 A1* | 11/2013 | Teng et al. | 345/474 |

OTHER PUBLICATIONS

Mao, C., Qin, S. F., and Wright, D. (2007). Sketch-based virtual human modelling and animation. In SG '07: Proceedings of the 8th international symposium on Smart Graphics, pp. 220-223. Springer-Verlag.*

Bouvier-Zappa, S., Ostromoukhov, V., and Poulin, P. 2007. Motion cues for illustration of skeletal motion capture data. In Proceedings of the 5th international symposium on Nonphotorealistic animation and rendering, 140.*

* cited by examiner

*Primary Examiner* — Devona Faulk
*Assistant Examiner* — Jin Ge
(74) *Attorney, Agent, or Firm* — Patterson + Sheridan, LLP

(57) ABSTRACT

Techniques are proposed for animating a plurality of objects in a computer graphics environment. A crowd choreography system receives a first beat description defining potential motions for the plurality of objects, where the first beat description includes a first motion characteristic. The crowd choreography system selects a first object from the plurality of objects and selects a first value for the first motion characteristic based on the first beat description. The crowd choreography system creates a first motion path for the first object based on the first value and animates the first object based on the first motion path.

17 Claims, 6 Drawing Sheets

CHOREOGRAPHY OF ANIMATED CROWDS

BACKGROUND OF THE INVENTION

1. Field of the Invention

The present invention relates to the field of computer animation and, in particular, to choreography of animated crowds.

2. Description of the Related Art

Computer-based animation often involves scenes that include groups of characters, objects, or agents, that are engaged in a particular activity, such as walking, running, standing, or sitting. During an animated scene, such character groups may provide an appropriate backdrop to the central action of the scene. For example, an animated scene that takes place on a populated university campus could involve a large number of medium-scale "ambient" crowd shots, where the crowd includes students, professors, and other characters. Although a crowd shot could be animated by separately rigging and animating each character in the crowd individually, such an approach involves a significant amount of human and computing resources and is, therefore, time and cost prohibitive.

One possible solution to this problem is to set each character in motion autonomously via a crowd simulator, such as a finite state machine (FSM) based crowd animation tool. One drawback with this approach is that such tools are typically configured to animate a group of characters where all characters are of the same type. For example, a crowd simulator could be configured to animate a group of bipedal characters such as human characters. Alternatively, the crowd simulator could be configured to animate a group of quadripedal characters such as horses. However, controlling both types of characters at the same time is often tedious with traditional systems because the set of animation parameters and options for each type of character may not be the same, particular when character types have significantly differing body morphologies. As a result, the animation artist composes different instructions and animation parameters separately for each character type. For crowds that have many types of characters, each with a variety of animation options, such an approach can quickly become burdensome for the animation artist. As a result, an animated crowd scene with varying character types would involve configuring the crowd simulator at least once for each different character type.

Another drawback with this approach is that typical crowd simulators do not handle transitions from one generic set of motions to another generic set of motions at a specific moment in time very well. For example, the animation artist could want a group of characters to stand for some amount of time, and then to begin walking at a certain point in time. In traditional finite state machine setups, the animator typically has to configure this transition uniquely for each type of character. In cases where a scene includes numerous character types, each with a unique set of possible versions of "stand" and "walk" animation sequences, this approach likewise becomes burdensome to the animation artist.

SUMMARY OF THE INVENTION

One embodiment of the present invention includes a method for animating objects in a computer graphics environment. The method includes receiving a first beat description defining potential motions for the plurality of objects, where the first beat description includes a first motion characteristic. The method further includes selecting a first object from the plurality of objects and selecting a first value for the first motion characteristic based on the first beat description. The method further includes creating a first motion path for the first object based on the first value and animating the first object based on the first motion path.

Other embodiments include, without limitation, a computer-readable storage medium that includes instructions that enable a processing unit to implement one or more aspects of the disclosed methods as well as a computing system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
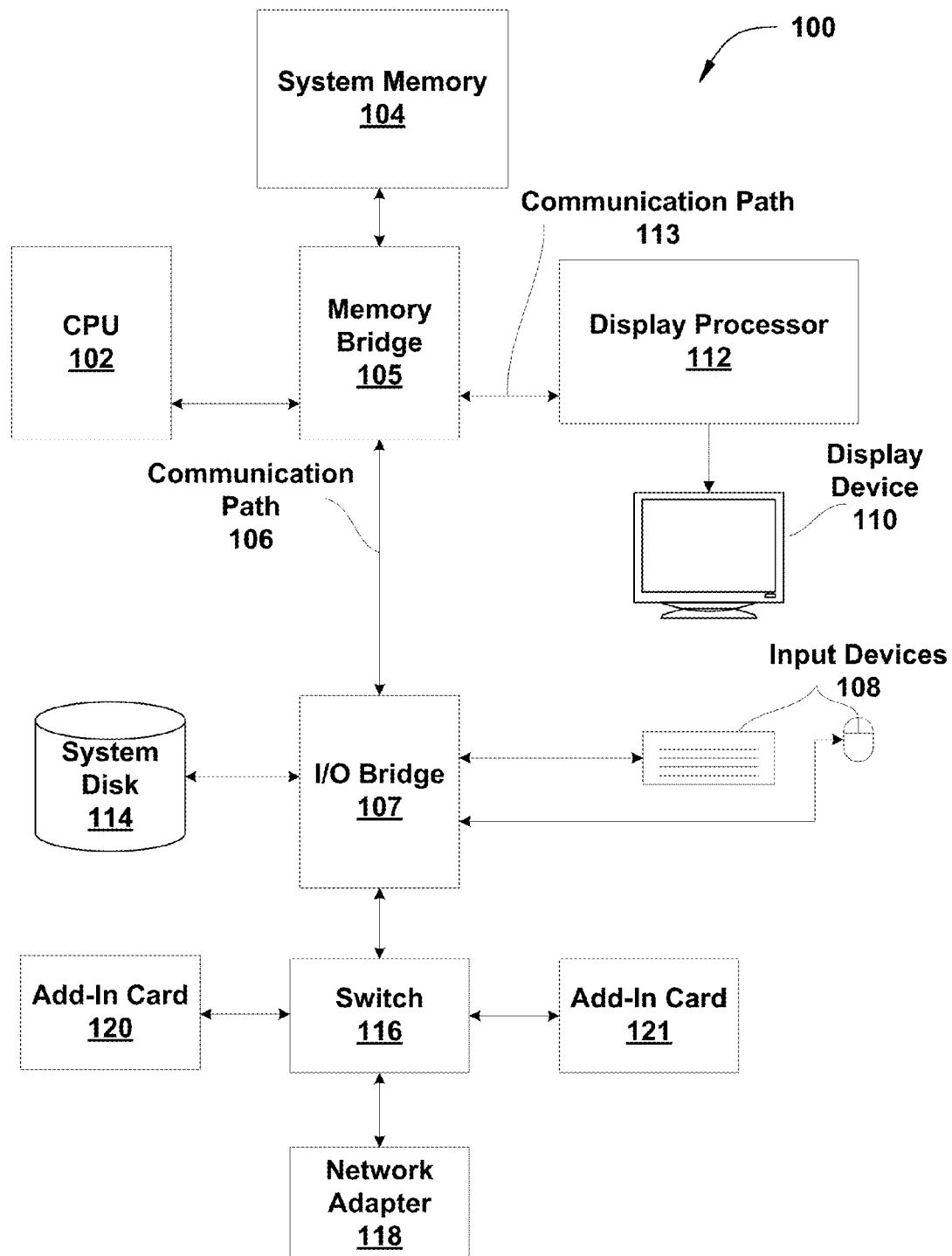
FIG. 1 is a block diagram of a system configured to implement one or more aspects of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

HARDWARE OVERVIEW

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
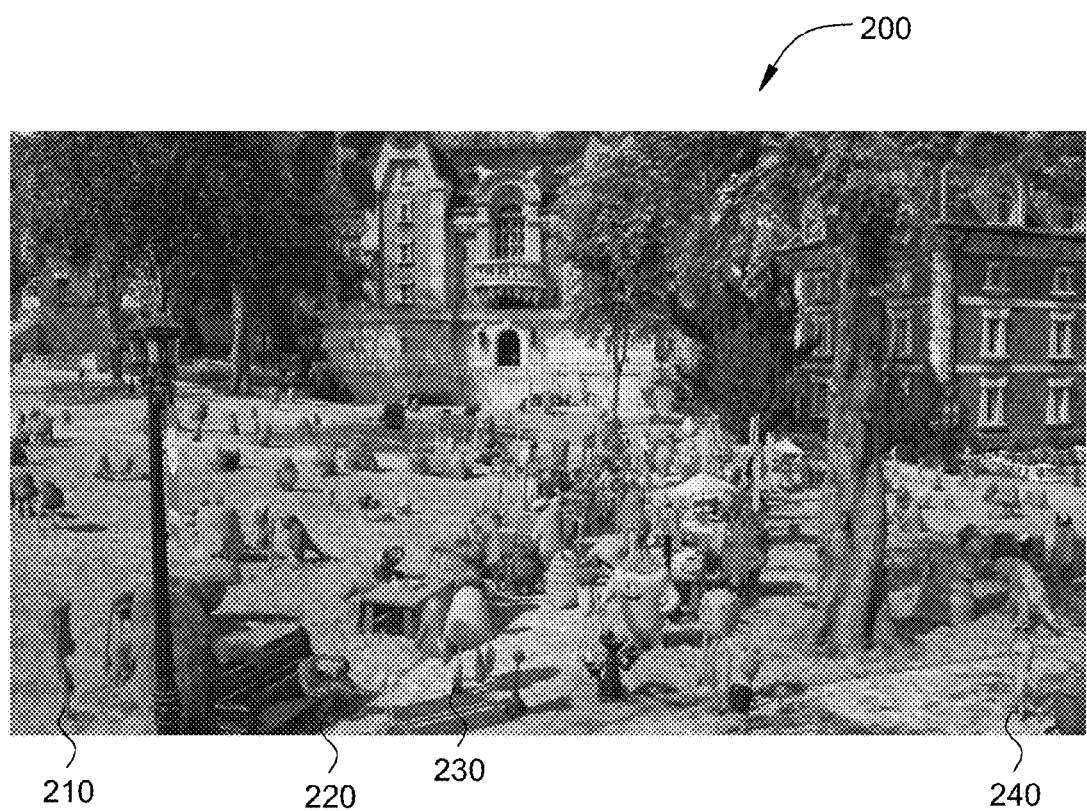
FIG. 2 is a rendered image that illustrates various characters in an animated crowd, according to one embodiment of the invention.

FIG. 2 is a rendered image 200 that illustrates various characters in an animated crowd, according to one embodiment of the invention. As shown, the rendered image 200 includes several exemplary characters 210, 220, 230, 240.

Three of the exemplary characters are bipeds. As used herein, the term "character" is used interchangeably with "object" or "agent." The first character 210 is a first type of bipedal character in a standing pose. The second character 220 is a second type of bipedal character in a sitting pose. The third character 230 is a third type of bipedal character in a walking pose. If all three types of bipedal characters 210, 220, 230 exhibit the same forms of animated movement and styles, then the bipedal characters may share an animation library, so long as the animation library includes standing, sitting, and walking poses. Alternatively, if all three types of bipedal characters 210, 220, 230 exhibit different forms of animated movement and styles, then each bipedal character type may access a different animation library, where the animation library includes various poses appropriate for the particular character type. Character 240 is a type of pentapedal character in a standing pose. Although bipedal character 210 and pentapedal character 240 are both in standing poses, characters 210 and 240 may access different animation libraries that include standing poses appropriate to each character's 210, 240 type.

Figure 3:
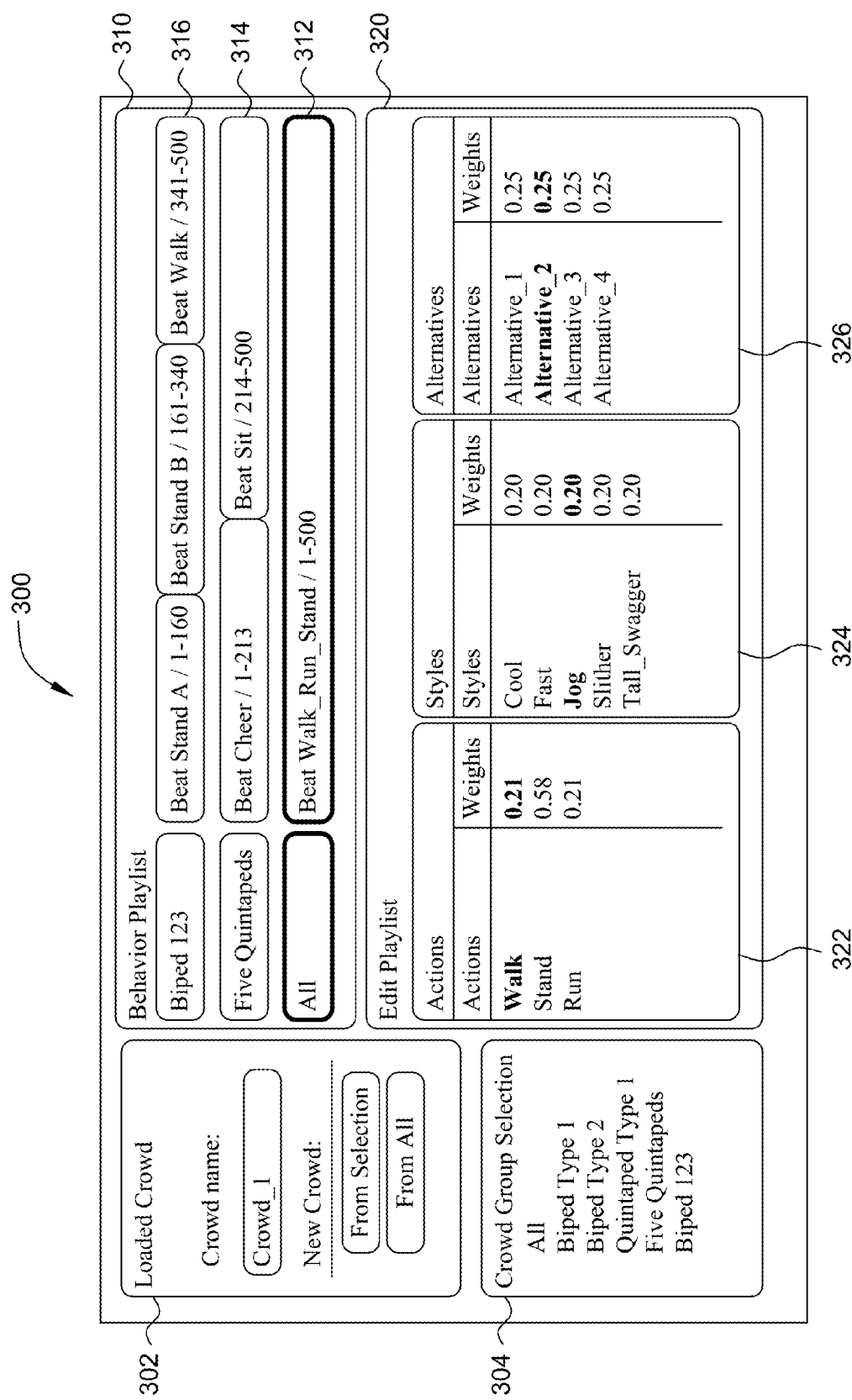
FIG. 3 illustrates a graphical user interface for choreographing a crowd of animated characters, according to one embodiment of the invention.

FIG. 3 illustrates a graphical user interface 300 for choreographing a crowd of animated characters, according to one embodiment of the invention. As shown, the graphical user interface 300 includes a loaded crowd window 302, a crowd group selection window 304, a behavior playlist 310, and an edit playlist 320.

The loaded crowd window 302 indicates the name of the crowd that is currently loaded in memory and available for editing. The loaded crowd window 302 provides a mechanism for creating a new crowd. As used herein, a crowd is global object that includes a group of animatable characters of varying types where each character type may exhibit different forms of animated movement and styles. As shown, the currently loaded crowd is called "Crowd_1." In addition, new crowds may be created using the "New Crowd:" portion of the loaded crowd window 304. The new crowd may be created from one or more selected crowds in the crowd group selection window 304 by using the "From Selection" button. Alternatively, the new crowd may be created from the group of all characters in the currently loaded crowd by using the "From All" button. Once a crowd has been created, existing characters may be deleted from and new characters added to the crowd as desired.

The crowd group selection window 304 includes the names of crowd groups that are currently accessible via the graphical user interface 300. As shown, the crowd group selection window 304 includes the name of six different crowd groups. The crowd group named "All" is a crowd group that includes all characters of the currently loaded crowd. The crowd groups named "Biped Type 1," "Biped Type 2," and "Quintaped Type 1," includes characters belonging to a first biped type, a second biped type, and a first quintaped type, respectively. The crowd group named "Five Quintapeds" includes five specific quintaped characters, such as five characters selected from the "Quintaped Type 1" crowd group. The crowd group named "Biped 123" includes one specific character (Biped 123), such as a character selected from either the "Biped Type 1" crowd group or the "Biped Type 2" crowd group.

The behavior playlist 310 includes one or more "beat sequences" 312, 314, 316, where each beat sequence defines the motion of a crowd group over a specified period of time, where the motion is defined in probabilistic terms. As such, a beat sequence may be thought of as being analogous to one or more "actions" or "story beats" in a screenplay. For example, the definition for a beat sequence 312, 314, 316 could be analogous to a directorial expression such as, "you fifty characters walk around during this shot while you seventy-five characters stand" or "all of you characters stand around until halfway through the shot, and then start cheering or jumping." The set of beats and beat sequences form a hierarchical set of probabilistically weighted collections of action specifications. Each beat is associated with a group of characters, or crowd group, where the set of available actions, styles, and alternatives for the crowd group is constrained by the available action inventory for the corresponding crowd group. A beat may be "viewed" from the perspective of different subgroups of characters within a crowd group. A beat may be attached to a single character "view" and then probabilistically sampled to return a fully specified action or motion.

In various embodiments, a beat may exist over a precise amount of time or an imprecise amount of time in a shot. Alternatively, a beat may specify actions or motions in the context of a timeless state. For example, a beat could specify an action or motion for a character while that character is positioned within a certain region in 3D space. Such a beat would terminate when the character moves outside of the certain region.

Figure 5:
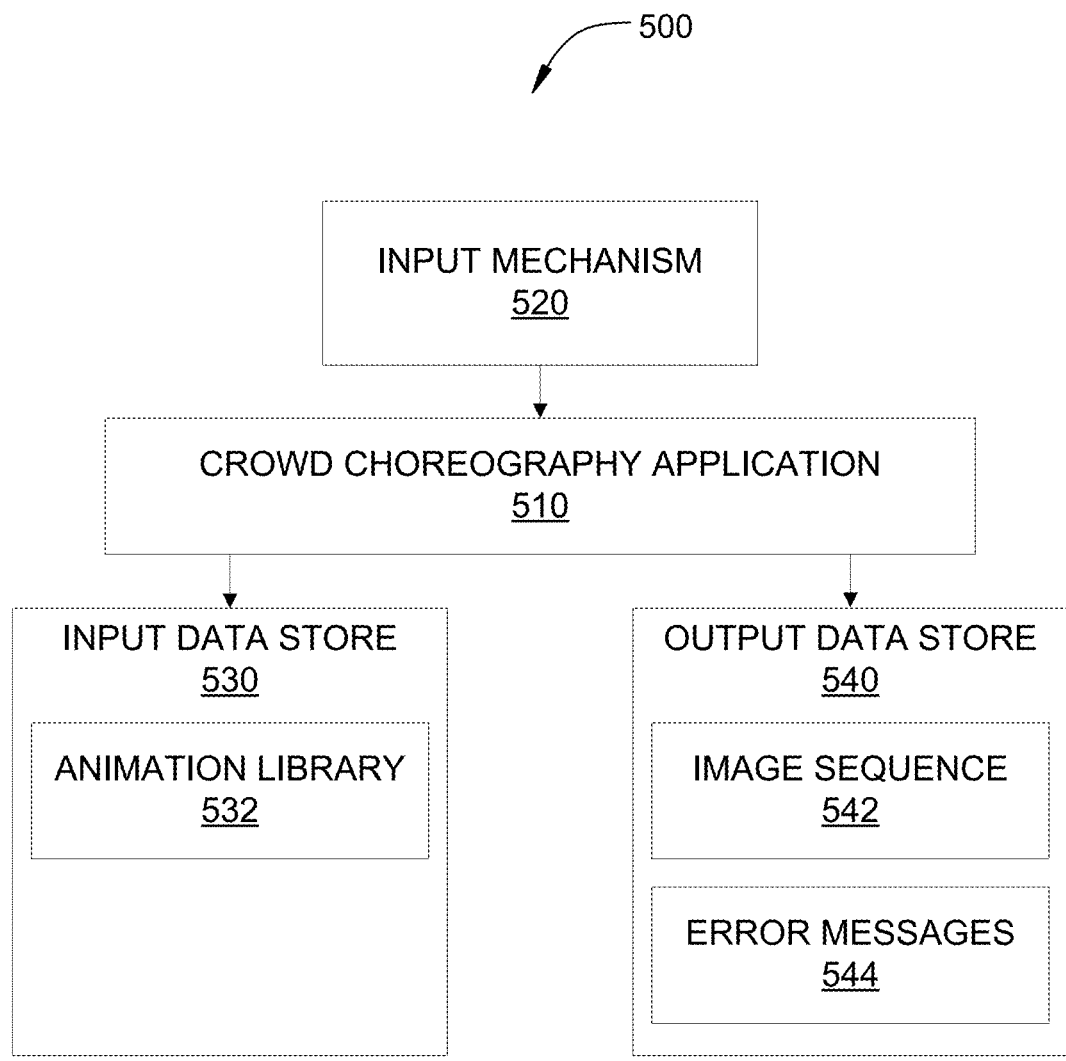
FIG. 5 illustrates a crowd choreography system as may be implemented on the computing system of FIG. 1, according to one embodiment of the invention.

During animation, the beats inform a crowd choreography application, an embodiment of which is described in conjunction with FIG. 5, that provides high-level fully-directed locomotion for each character in a crowd group associated with each beat. The crowd choreography application creates a new character path for each character by offsetting linear approximations of guide curves, which may appear in a variety of forms, including, without limitation, pre-existing Bezier paths or user-defined 2D sketches. Points sampled from the guide curves are projected onto a ground plane and used for a Bezier curve fit. Adaptive sampling may be used to provide greater resolution in areas of quickly varying terrain. Characters in a crowd group are initially dispersed along the available paths to minimize collisions between characters over time. Layout translation along the path may be applied to each character based on a valid speed determined from an inventory of indexed animation motion clips within an animation library. Metadata associated with the animation motion clips allows for conversion of the beats into sequenced animation clips for each character during animation and image rendering.

As further described herein, each beat sequence 312, 314, 316 similarly describes a general, rather than a specific, direction for a corresponding crowd group. The general direction for the crowd group translates to a specific direction for each character when the scene including the crowd group is rendered.

The first beat sequence 312 is the "All" beat sequence that directs motion for all characters in the currently loaded crowd. As shown, the first beat sequence 312 includes a single beat entitled "Beat Walk_Run_Stand." The beat is defined to begin at frame 1 and end at frame 500. As shown, the first beat sequence 312 has a bold border, indicating that the first beat sequence 312 is selected. As further described below, the edit playlist 320 details parameters associated with the currently selected beat sequence.

The second beat sequence 314 is the beat sequence that directs motion for characters included in the "Five Quintapeds" crowd group. As shown, the second beat sequence 314 includes two beats. The first beat is entitled "Beat Cheer." This first beat is defined to begin at frame 1 and end at frame 213. The second beat is entitled "Beat Sit." This second beat is defined to begin at frame 214 and end at frame 500.

In some embodiments, a transition motion clip may be inserted into the motion for each character between two successive beats in a beat sequence. For example, the two beats of the second beat sequence 314 could indicate that the five quintapeds transition from a cheering action to a sitting action. Because such a transition could appear to be unnatural, a transition motion could be inserted in the motion for each of the five quintapeds between the cheering action and the sitting action, where the transition motion defines a natural movement from a cheering position to a sitting position. By inserting this transition motion, the motion for the five quintapeds would transition smoothly from cheering to sitting. If no appropriate transition motion is found, the five quintapeds could be rendered showing an abrupt change from cheering to sitting, and an error message could be generated. This error message could prompt a user to take appropriate action, including, without limitation, changing the beat sequence to avoid the transition or creating a motion clip with an appropriate transition.

The third beat sequence 316 is the beat sequence that directs motion for a crowd group that includes a single character identified as "Biped 123." As shown, the third beat sequence 316 includes three beats. The first beat is entitled "Beat Stand A." This first beat is defined to begin at frame 1 and end at frame 160. The second beat is entitled "Beat Stand B." This second beat is defined to begin at frame 161 and end at frame 340. The third beat is entitled "Beat Walk." This third beat is defined to begin at frame 341 and end at frame 500.

In some embodiments, each beat may not necessarily start and end at the exact frame shown in the behavior playlist 310. For example, the second beat sequence 314 includes a beat that begins at frame 1 and ends 213 and another beat that begins on 214 and ends at frame 500. When the crowd is rendered, individual characters included in the second beat sequence 314 may transition from "Beat Cheer" to "Beat Sit" at a point in time that is near frames 213 and 214, but not exactly at the frame cut between frames 213 and 214. By allowing a transition from one beat to another to vary slightly from the designated transition point may provide a more natural look when characters in a crowd group sequence from one beat to the next beat.

In some embodiments, the weights shown in each of the actions screen 322, styles screen 324, and alternatives screen may be initialized to be equal to each other and to sum to 1.0. The weights may then be altered as desired for a particular beat sequence, and the system automatically maintains the characteristic that the set of weights for each screen sum to 1.0 as the individual weights are altered.

Although the beats and beat sequences are described in units of time, any technically feasible metric may be used to define the duration of beats and beat sequences. For example, a beat could be specified in positional terms. As such, a first beat in a beat sequence could direct the characters in a crowd group to run from a starting position until each character enters a defined region of space in the scene. A second beat in the beat sequence could direct each character to transition from a running action to a standing action when the character has entered the defined region.

If a character is a member of more than one crowd group, then the character's motion is defined by the highest beat of which the character is a member. For example, the motion of a quintaped who is a member of the "Five Quintapeds" crowd group would be defined by the "Five Quintapeds" beat 314 rather than the "All" beat 312. The motion of character Biped 123 would be defined by the "Biped 123" beat 316 rather than the "All" beat 312. The motion of other characters would be defined by the "All" beat 312.

The edit playlist 320 includes three menus where motions related to a selected beat may be specified. As shown, the edit playlist includes an actions menu 322, a styles menu 324, and an alternatives menu 326.

The actions menu 322 specifies the top level category defining the motion of the selected beat and crowd group. As shown, the selected beat is from the first beat sequence 312, identified as Beat Walk_Run_Stand for the All crowd group. The actions menu 322 indicates that the selected beat includes three action types—namely, walk, stand, and run. The weights indicate the relative probability that a given character will exhibit the corresponding action. Typically, the sum of the action weights is 1.00. Accordingly, the actions menu 322 indicates that approximately 21% of the characters in the All crowd group perform the walk action, 58% of the characters perform the stand action, and 21% of the characters perform the run action. In one embodiment, the actions shown in the actions menu 322 may be those actions which all character types in the corresponding crowd group may perform. The "walk" action is in bold type, indicating that the walk action is selected. As a result, the styles menu 324 indicates the various styles of walking that the characters in the All crowd group may perform.

The styles menu 324 specifies the second level category defining the motion of the selected beat and crowd group. The styles menu 324 indicates that the selected beat includes five styles of the walking action type—namely, cool, fast, jog, slither, and tall_swagger. The weights indicate the relative probability that a given character will exhibit the corresponding walking style. Typically, the sum of the style weights is 1.00. Accordingly, the styles menu 324 indicates that approximately 20% of the walking characters in the All crowd group perform a cool walk, 20% perform a fast walk, 20% perform a jog, and so on. In one embodiment, the styles shown in the styles menu 324 may be those styles of a given action which all character types in the corresponding crowd group may perform. The "jog" style is in bold type, indicating that the jog style of walking is selected. As a result, the alternatives menu 326 indicates the various alternatives of jogging that the walking characters in the All crowd group may perform.

The alternatives menu 326 specifies the third level category defining the motion of the selected beat and crowd group. The alternatives menu 326 indicates that the selected beat includes five alternatives for the jogging style of the walking action type—namely, alternative_1, alternative_2, alternative_3, and alternative_4. The weights indicate the relative probability that a given character will exhibit the corresponding alternative of jogging. Typically, the sum of the alternative weights is 1.00. Accordingly, the alternatives menu 326 indicates that approximately 25% of the jogging characters in the All crowd group perform each of the four jogging alternatives. In one embodiment, the alternatives shown in the alternatives menu 326 may be those styles of a given action which all character types in the corresponding crowd group may perform. In another embodiment, the alternatives shown in the alternatives menu 326 selects a particular motion clip corresponding to a specific motion definition for the selected action and style. The "alternative_2" style is in bold type, indicating that alternative 2 of the jogging style of walking is selected.

In one embodiment, various views for a beat may be specified, to further enable the user to express a complex probabilistic intention for crowd behavior that may otherwise be difficult to express. By using views, a beat may be edited for a specific character or a subset of characters associated with the currently loaded crowd. In other words, if a particular crowd includes horses, humans, and aliens, all in the same character group, the view may be set to "horses" to view and edit just the horse behavior. The weights shown in the actions menu 322, the styles menu 324, and the alternatives menu 326 may then reflect the relative weights for those actions, styles, and alternatives that apply to horses. Such weights shown for each of the actions menu 322, the styles menu 324, and the alternatives menu 326 may be normalized to sum to 1.0 for those characters included in the view. Alternatively, the view may be set to a particular alien, to view and edit just the behavior for the particular alien. The weights shown in the actions menu 322, the styles menu 324, and the alternatives menu 326 may then reflect the relative weights for those actions, styles, and alternatives that apply to the particular alien. Such weights shown for each of the actions menu 322, the styles menu 324, and the alternatives menu 326 may be normalized to sum to 1.0 for the particular alien included in the view. In each of these cases, edits are made using the relative weights for the current view. Corresponding weight changes are made to correctly reflect the relative weights of the crowd group as a whole.

In one example, a loaded crowd group could include horses, humans, and aliens. The available actions and weights could be Vaporize: 0.25, Abduct: 0.25, Trot: 0.25, and FeelEmpathy: 0.25. Actions could apply to only certain character types. So, Vaporize and Abduct could apply to only aliens, Trot could apply to only horses, and FeelEmpathy could apply to only humans. The view could be set to show and edit weights for only the aliens in the crowd group. The beat would then only show aliens, and the actions menu 322 would reflect the choices and weights as follows: Vaporize: 0.5, Abduct: 0.5. The user could then adjust the Vaporize weight to 0.75, reflecting that aliens would be more likely to select the Vaporize action. The weight for Abduct would be reduced to 0.25, so that the sum of the action weights for aliens would sum to 1.0. Correspondingly, the action weights for the crowd group as a whole would be adjusted to Vaporize:

0.375, Abduct: 0.125, Trot: 0.25, FeelEmpathy: 0.25, which sum to 1.0 and reflect the new relative action weights for the aliens, as edited.

In this manner, a view would reflect the selections available for a subset of characters in a crowd group. Changes in relative weights would reflect changes in statistical behavior for the characters included in the subset. These relative weight changes would span across the corresponding weights for the crowd group as a whole, while adjusting the relative frequencies within the weight span. When the beat is sampled during simulation to select actions for aliens, the view would be set to just those actions available for aliens, and the edited weights would maintain their relative values as established by the user. Accordingly, the aliens in the crowed group would be three times more likely to select the Vaporize action than the Abduct action.

The weights in the overall group of characters would also be maintained, as expressed in the overall group weights. As a result, editing for subgroups within a crowd group would be facilitated, while relative weights defining behavior across the entire crowd group would be maintained.

It will be appreciated that the system shown herein is illustrative and that variations and modifications are possible. For example, the edit playlist 320 is described as being associated with three categories specified as actions, styles, and alternatives. However, the edit playlist 320 could be implemented with any number of categories where each category is specified in any technically feasible manner.

Once a crowd is defined, an initial image frame may be created by an application program. Alternatively, a user may pose each character defined in the crowd in an initial position. Alternatively, an application program may create an initial frame, and the user may adjust the pose of one or more characters before starting the animation. Then, a crowd choreography application reads the variables as defined in the graphical user interface 300, creates a specific set of motion directives for each character based on the variables, and animates the actors within the crowd. The crowd choreography application then generates a sequence of rendered image frames by applying the per-character directives to each of the respective characters in the crowd. The crowd choreography application may compute the positions of each character at each image frame using any technically feasible approach, including, without limitation, a simulation-based tool or a finite state machine model.

Figure 4:
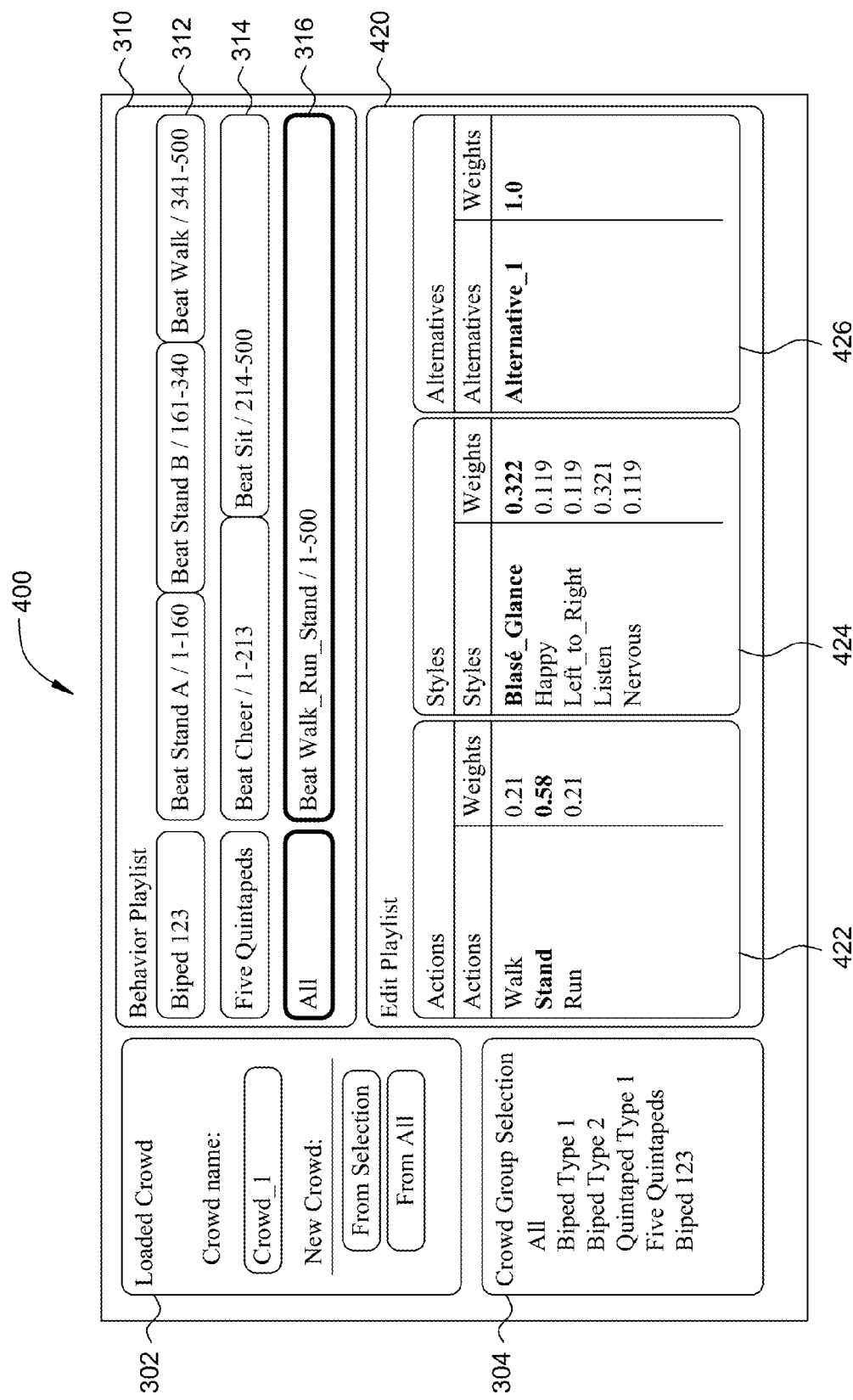
FIG. 4 illustrates a graphical user interface for choreographing a crowd of animated characters, according to another embodiment of the invention.

FIG. 4 illustrates a graphical user interface 400 for choreographing a crowd of animated characters, according to another embodiment of the invention. As shown, the graphical user interface 400 includes a loaded crowd window 302, a crowd group selection window 304, a behavior playlist 310, and an edit playlist 420. The loaded crowd window 302, crowd group selection window 304, behavior playlist 310, and edit playlist 420 function substantially the same as set forth above in conjunction with FIG. 4, except as further described below.

As shown in FIG. 4, the "stand" action is in bold type in the actions menu 422 of the edit playlist 420, indicating that the stand action is selected. As a result, the styles menu 424 indicates the various styles of standing that the characters in the All crowd group may perform.

The styles menu 324 indicates that the selected beat includes five styles of the standing action type—namely, blasé_glance, happy, left_to_right, listen, and nervous. The weights indicate that the relative probability that a given character will exhibit each of the corresponding standing styles is 0.322, 0.119, 0.119, 0.321, and 0.119, respectively. Accordingly, the styles menu 424 indicates that approximately 32.2% of the standing characters in the All crowd group perform a blasé glance standing poses, 11.9% perform a happy standing pose, 11.9% perform a standing pose, and so on. The "blasé_glance" style is in bold type, indicating that the blasé glance style of standing is selected. As a result, the alternatives menu 426 indicates the various alternatives of blasé glance that the standing characters in the All crowd group may perform.

The alternatives menu 426 indicates that the selected beat includes one alternative for the blasé glance style of the standing action type—namely, alternative_1. As there is only one alternative, the alternatives menu 426 indicates that 100% of the characters in the All crowd group performing the blasé glance style of standing perform alternative 1. The "alternative_1" style is in bold type, indicating that alternative 1 of the blasé glance style of standing is selected.

FIG. 5 illustrates a crowd choreography system 500 as may be implemented on the computing system 100 of FIG. 1, according to one embodiment of the invention. As shown, the crowd choreography system 500 includes a crowd choreography application 510, an input mechanism 520, an input data store 530, and an output data store 540.

The crowd choreography application 510 is a software program including instructions that, when executed, performs the techniques described above in conjunction with FIGS. 2-4. The crowd choreography application 510 may reside in system memory 104 where the instructions of the software program may be retrieved and executed by the CPU 102.

The input mechanism 520 receives one or more input variables, such as a description including one or more beats, as described herein, and transmits the one or more input variables to the crowd choreography application 510. For example, the input mechanism 520 could receive a definition of a group of actors including multiple character types and motion types, along with probabilities associated with each motion type, and sequencing information that defines transitions between one motion type and another. The input mechanism 520 may provide data to the crowd choreography application 510 via one or more input devices 108 in conjunction with the graphical user interface 300 400.

The input data store 530 provides input data to the crowd choreography application 510. As shown, the input data store 530 includes an animation library 532. The animation library 532 includes motion clips for various character types and motion types. The motion clips may be organized by character type. For example, the animation library 532 could include a first set of motion clips for a type of bipedal characters, such as human characters. The animation library 532 could also include a second set of motion clips for a type of quadripedal characters, such as horses. The animation library 532 could also include a third set of motion clips for a type of quintapedal characters, and so on. For each type of characters, the animation library 532 may include motion clips associated with various motion types, where a motion type may include a particular action, a style for that action, and one of a set of alternatives for that action and style.

The motion clips in the animation library 532 may be created via any technically feasible approach, including, without limitation, by simulation, motion capture, and stochastic methods. The motion clips may be organized into character types, actions, styles, and alternatives via any technically feasible technique, including, without limitation, storing motion clips in a particular location in a hierarchical file system, using identifying file names for each motion clip, or inserting appropriate attributes within each motion clip.

The input data store 530 may also include any other input information for the crowd choreography application 510 including, without limitation, previously choreographed crowd descriptions (not shown). The input data store 530 may be located within the system disk 114.

The output data store 540 provides output data from the crowd choreography application 510 for storage or display. As shown, the output data store 540 includes an image sequence 542 and error messages 544.

The image sequence 542 includes a series of image frames produced by the crowd choreography application 510, where each image frame includes a rendered image of each visible character in the crowd in a position based on the character's type, action, action style, and style alternative. The image frames in the image sequence 542 may be displayed on the display device 110 to view the crowd of characters in motion over time.

The error messages 544 include various errors and warnings generated by the crowd choreography application 510. For example, the crowd choreography application 510 could encounter a sequence that calls for a transition from a first action to a second action, but no appropriate transition motion clip is found in the animation library 532. In such cases, the crowd choreography application 510 would render the image sequence 542 showing an abrupt change from the first action to the second action. The crowd choreography application 510 would also store an appropriate message in the error messages 544 stating that a particular transition motion clip was not found. The error messages 544 would then be reviewed, and appropriate action could be taken, including, without limitation, changing the parameters of the sequence, or creating an appropriate transition motion clip.

The output data store 540 may also include any other output information for the crowd choreography application 510 including, without limitation, a copy of the currently loaded choreographed crowd description (not shown). The output data store 540 may be located within the system disk 114. Alternatively, the output data store 540 may be located within a memory in a format suitable for display on the display device 110.

Figure 6:
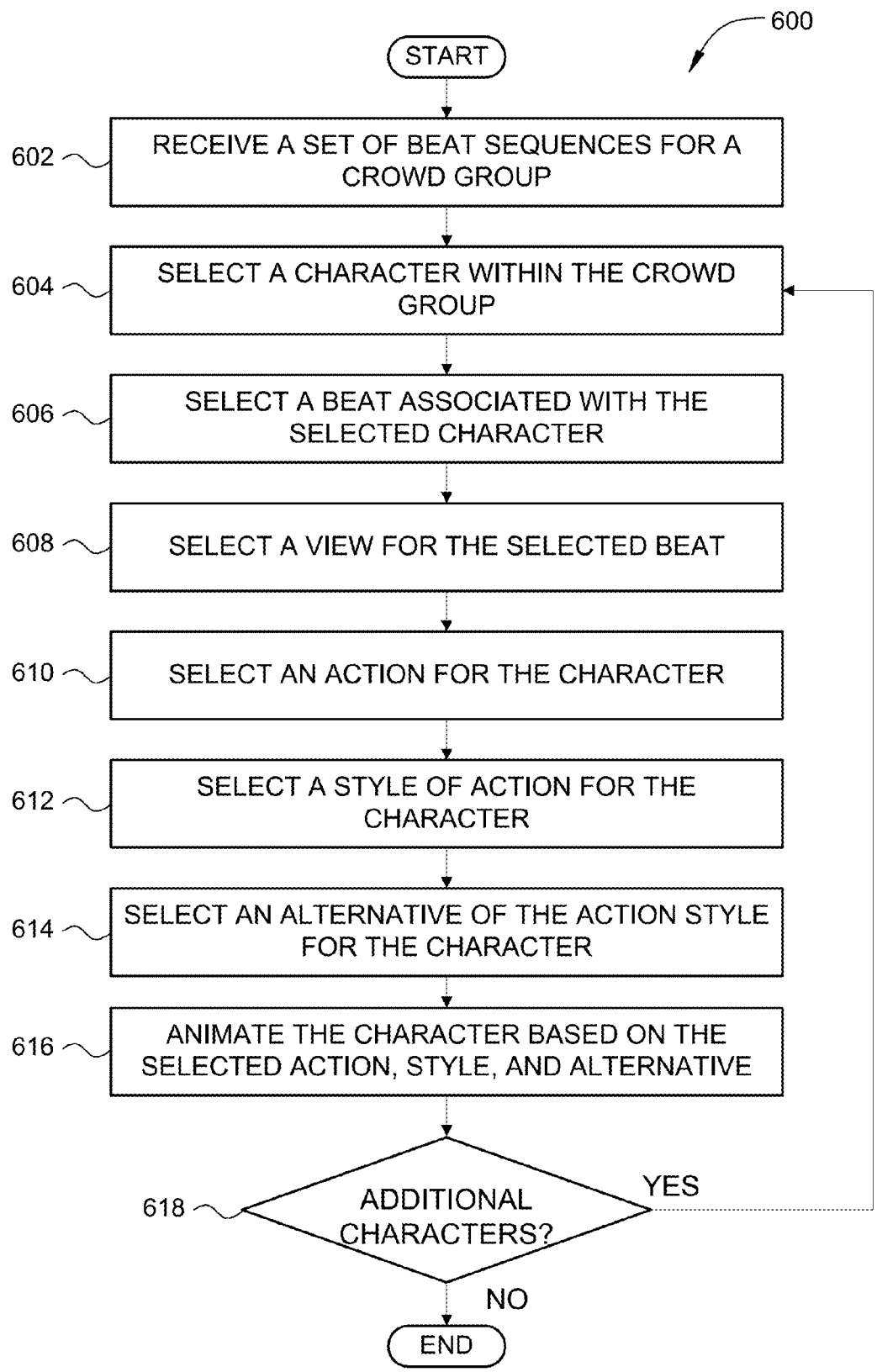
FIG. 6 sets forth a flow diagram of method steps for choreographing an animated crowd with the system of FIG. 5, according to one embodiment of the invention.

FIG. 6 sets forth a flow diagram of method steps for choreographing an animated crowd with the system of FIG. 5, according to one embodiment of the invention. Although the method steps are described in conjunction with the systems of FIGS. 1 and 5, persons skilled in the art will understand that any system configured to perform the method steps, in any order, falls within the scope of the present invention.

A method 600 begins at step 602, where the crowd choreography system 500 receives a set of beat sequences associated with a crowd group. In various embodiments, the crowd group may include all characters in a given crowd. Alternatively, the crowd group may include a subset of the characters in the crowd, where the subset includes characters of one or more character types. Alternatively, the crowd group may include a single character from the crowd. A beat sequence may include a single beat defined for the crowd group. Alternatively, the beat sequence could include two or more beats defined for the crowd group, along with transition points between the beats within a given beat sequence.

At step 604, the crowd choreography system 500 selects a character that is included within the received crowd group. At step 606, the crowd choreography system 500 selects a beat associated with the selected character, where the beat is included in one of the beat sequences in the set of beat sequences. If the selected character is a member of only one beat sequence in the set of beat sequences, then an active beat associated with that beat sequence is selected, based on a frame time, character position, or other data associated with the beat sequence. If the selected character is a member of more than one beat sequence in the set of beat sequences, then the crowd choreography system 500 selects the beat sequence with the highest priority of which the selected character is a member. The crowd choreography system 500 then selects an active beat associated with the selected beat sequence, based on a frame time, character position, or other data associated with the beat sequence. At step 608, the crowd choreography system 500 selects a view for the selected beat, where the view indicates motion actions, styles, and alternatives available for the selected character.

At step 610, the crowd choreography system 500 selects an action for the selected character. In one example, the crowd choreography system 500 could select an action for the character from a list of actions that all characters in the crowd group would be able to perform, based on the composite weights for the crowd group. In another example, the crowd choreography system 500 could select an action for the character from a list of actions that the characters in the view would be able to perform, based on the weights for the characters included in the view. The crowd choreography system 500 could select the action based on relative probabilities defined for the available actions for the character.

At step 612, the crowd choreography system 500 selects a style of action for the selected character. In one example, the crowd choreography system 500 could select a style of action for the character from a list of action styles that all characters in the crowd group would be able to perform, based on the composite weights for the crowd group. In another example, the crowd choreography system 500 could select an action style for the character from a list of action styles that the characters in the view would be able to perform, based on the weights for the characters included in the view. The crowd choreography system 500 could select the action style based on relative probabilities defined for the available action styles for the character.

At step 614, the crowd choreography system 500 selects an alternative of the action style for the selected character. In one example, the crowd choreography system 500 could select an alternative of the action style for the character from a list of action style alternatives that all characters in the crowd group would be able to perform, based on the composite weights for the crowd group. In another example, the crowd choreography system 500 could select an alternative of the action style for the character from a list of action style alternatives that the characters in the view would be able to perform, based on the weights for the characters included in the view. The crowd choreography system 500 could select the action style alternative based on relative probabilities defined for the available action style alternatives for the character.

At step 616, the crowd choreography system 500 animates the selected character based on the selected action, style, and alternative. In one embodiment, the crowd choreography system 500 may determine the initial position for the selected character. In another embodiment, a user may direct the crowd choreography system 500 to place the selected character in an initial position. In yet another embodiment, the crowd choreography system 500 may determine an initial position for the selected character, and the user may adjust the initial position as desired. Once the initial position for the selected character is established, the crowd choreography system 500 animated the selected character.

At step 618, the crowd choreography system 500 determines whether additional characters in the crowd remain that have not yet been animated. If no additional characters remain, then the method 600 terminates.

If additional characters remain, then the method 600 proceeds to step 604, described above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In sum, computer-generated characters in a crowd are choreographed to perform various motions according to general directions that are organized as "beats." Each character performs a specific action, style, and alternative for a given motion based on the relative probabilities established for those actions, styles, and alternatives. Multiple beats may form a beat sequence, where one beat ends and another beat begins based on whether a certain time in the shot is reached or when a character reaches a certain defined region in space. Multiple layers of beat sequence may exist, where most characters perform actions according to one beat, while a select few characters or a single character performs motion based on a beat sequence that is different than the beat sequence defined for the rest of the characters. Because the beats are defined in a high-level, generic way, animation directions do not have to be specified for the various types of actors—even when those actors comprise a variety of body morphologies.

While the foregoing is directed to embodiments of the present invention, other and further embodiments of the invention may be devised without departing from the basic scope thereof, and the scope thereof is determined by the claims that follow.

What is claimed is:

1. A computing system, comprising:
a memory that is configured to store instructions for a program; and
a processor that is configured to execute the instructions for the program to animate a plurality of objects in a computer graphics environment, by performing an operation comprising:
selecting a first object from a plurality of objects, wherein each object in the plurality of objects is associated with an object type in a plurality of object types and each object type in the plurality of object types is associated with a different set of motion clips in an animation library;
selecting a first value for a first motion characteristic associated with the first object based on a first beat description defining potential motions for the plurality of objects, wherein the first beat description comprises the first motion characteristic, comprising:
selecting a first object type associated with the first object, wherein the first object type is included in the plurality of object types;
retrieving a first plurality of values available for the first motion characteristic based on the first object type;
retrieving a first plurality of relative probabilities where each relative probability in the first plurality of relative probabilities corresponds to a different value in the first plurality of values; and
setting the first value to a value within the first plurality of values based on the first plurality of relative probabilities;
creating a first motion path for the first object based on the first value;
animating the first object based on the first motion path to generate image sequences; and
outputting the image sequences of the first object to the display device.

2. A computerized method executed by an electronic device having a display and a processor for animating a plurality of objects in a computer graphics environment, the method comprising:
selecting a first object from a plurality of objects, wherein each object in the plurality of objects is associated with an object type in a plurality of object types and each object type in the plurality of object types is associated with a different set of motion clips in an animation library;
selecting a first value for a first motion characteristic associated with the first object based on a first beat description defining potential motions for the plurality of objects, wherein the first beat description comprises the first motion characteristic, and wherein selecting the first value further comprises:
selecting a first object type associated with the first object, wherein the first object type is included in the plurality of object types;
retrieving a first plurality of values available for the first motion characteristic based on the first object type;
retrieving a first plurality of relative probabilities where each relative probability in the first plurality of relative probabilities corresponds to a different value in the first plurality of values; and
setting the first value to a value within the first plurality of values based on the first plurality of relative probabilities;
creating a first motion path for the first object based on the first value;
animating the first object based on the first motion path to generate image sequences; and
outputting the image sequences of the first object to the display device.

3. The method of claim 2, further comprising:
selecting a second value for the first motion characteristic based on a second beat description defining potential motions for the plurality of objects, wherein the second beat description comprises the first motion characteristic;
creating a second motion path for the first object based on the second value; and
further animating the first object based on the second motion path.

4. The method of claim 3, further comprising:
determining whether a motion clip exists that transitions the first object from the first motion path to the second motion path;
upon determining that the motion clip exists, then inserting the motion clip between the first motion path and the second motion path; and upon determining that the motion clip does not exist, then creating an error message indicating that the motion clip does not exist.

5. The method of claim 3, wherein the first motion path ends and the second motion path begins at a specified time in the animation.

6. The method of claim 3, wherein the first motion path ends and the second motion path begins when the first object enters a specified region of space defined in the animation.

7. The method of claim 2, wherein the first motion characteristic comprises an action.

8. The method of claim 7, further comprising:
retrieving a second plurality of values available for a second motion characteristic based on the first object type, wherein the second motion characteristic comprises an action style associated with the action;
retrieving a second plurality of relative probabilities where each relative probability in the second plurality of relative probabilities corresponds to a different value in the second plurality of values; and
setting a second value to a value within the second plurality of values based on the second plurality of relative probabilities,
wherein the first motion path for the first object is further based on the second value.

9. The method of claim 8, further comprising:
retrieving a third plurality of values available for a third motion characteristic based on the first object type, wherein the third motion characteristic comprises an action style alternative associated with at least one of the action and the action style;
retrieving a third plurality of relative probabilities where each relative probability in the third plurality of relative probabilities corresponds to a different value in the third plurality of values; and
setting a third value to a value within the third plurality of values based on the third plurality of relative probabilities,
wherein the first motion path for the first object is further based on the third value.

10. A non-transitory computer-readable medium including instructions that, when executed by a processing unit, cause the processing unit to animate a plurality of objects in a computer graphics environment, by performing the steps of:
selecting a first object from a plurality of objects, wherein each object in the plurality of objects is associated with an object type in a plurality of object types and each object type in the plurality of object types is associated with a different set of motion clips in an animation library;
selecting a first value for a first motion characteristic associated with the first object based on a first beat description defining potential motions for the plurality of objects, wherein the first beat description comprises the first motion characteristic, and wherein selecting the first value further comprises:
selecting a first object type associated with the first object, wherein the first object type is included in the plurality of object types;
retrieving a first plurality of values available for the first motion characteristic based on the first object type;
retrieving a first plurality of relative probabilities where each relative probability in the first plurality of relative probabilities corresponds to a different value in the first plurality of values; and
setting the first value to a value within the first plurality of values based on the first plurality of relative probabilities;
creating a first motion path for the first object based on the first value;
animating the first object based on the first motion path to generate image sequences; and
outputting the image sequences of the first object to the display device.

11. The non-transitory computer-readable medium of claim 10, further comprising:
selecting a second value for the first motion characteristic based on a second beat description defining potential motions for the plurality of objects, wherein the second beat description comprises the first motion characteristic;
creating a second motion path for the first object based on the second value; and
further animating the first object based on the second motion path.

12. The non-transitory computer-readable medium of claim 11, further comprising:
determining whether a motion clip exists that transitions the first object from the first motion path to the second motion path;
upon determining that the motion clip exists, then inserting the motion clip between the first motion path and the second motion path; and
upon determining that the motion clip does not exist, then creating an error message indicating that the motion clip does not exist.

13. The non-transitory computer-readable medium of claim 11, wherein the first motion path ends and the second motion path begins at a specified time in the animation.

14. The non-transitory computer-readable medium of claim 11, wherein the first motion path ends and the second motion path begins when the first object enters a specified region of space defined in the animation.

15. The non-transitory computer-readable medium of claim 11, wherein the first motion characteristic comprises an action.

16. The non-transitory computer-readable medium of claim 15, further comprising:
retrieving a second plurality of values available for a second motion characteristic based on the first object type, wherein the second motion characteristic comprises an action style associated with the action;
retrieving a second plurality of relative probabilities where each relative probability in the second plurality of relative probabilities corresponds to a different value in the second plurality of values; and
setting a second value to a value within the second plurality of values based on the second plurality of relative probabilities,
wherein the first motion path for the first object is further based on the second value.

17. The non-transitory computer-readable medium of claim 16, further comprising:
retrieving a third plurality of values available for a third motion characteristic based on the first object type, wherein the third motion characteristic comprises an action style alternative associated with at least one of the action and the action style;
retrieving a third plurality of relative probabilities where each relative probability in the third plurality of relative probabilities corresponds to a different value in the third plurality of values; and setting a third value to a value within the third plurality of values based on the third plurality of relative probabilities, wherein the first motion path for the first object is further based on the third value.

* * * * *